No. 622,865. Patented Apr. 11, 1899.
E. E. RIES.
APPARATUS FOR LINE DISTRIBUTION BY INDUCTIONAL TRANSFORMERS OR SECONDARY GENERATORS FOR ELECTRIC RAILWAYS.
(Application filed Dec. 30, 1887.)
(No Model.) 2 Sheets—Sheet 1.
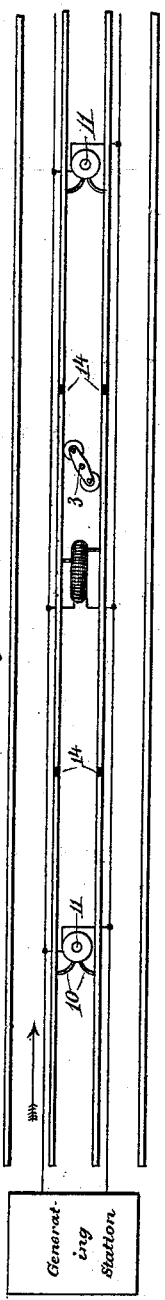
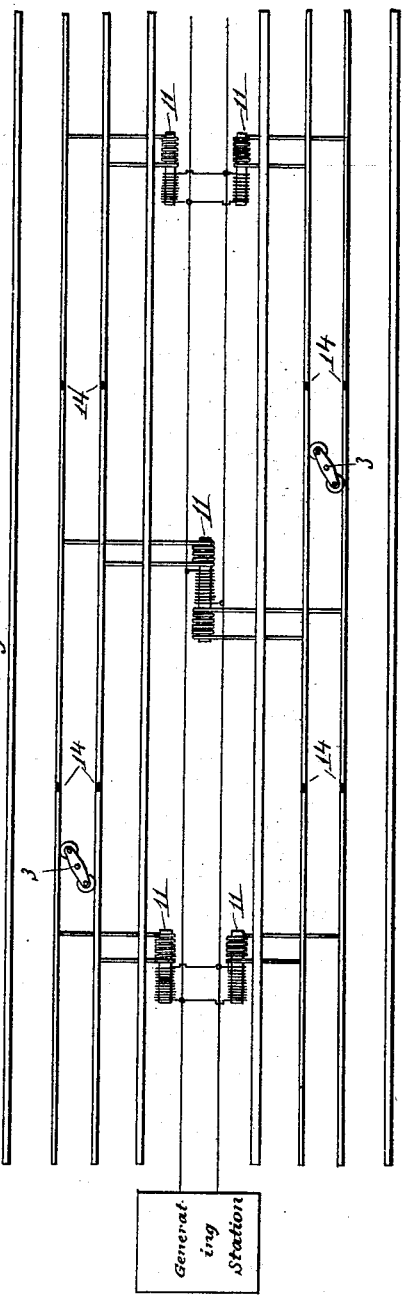
ATTEST:
INVENTOR:
Elias E. Ries;
By Harding & Tichenor
his Attorneys.

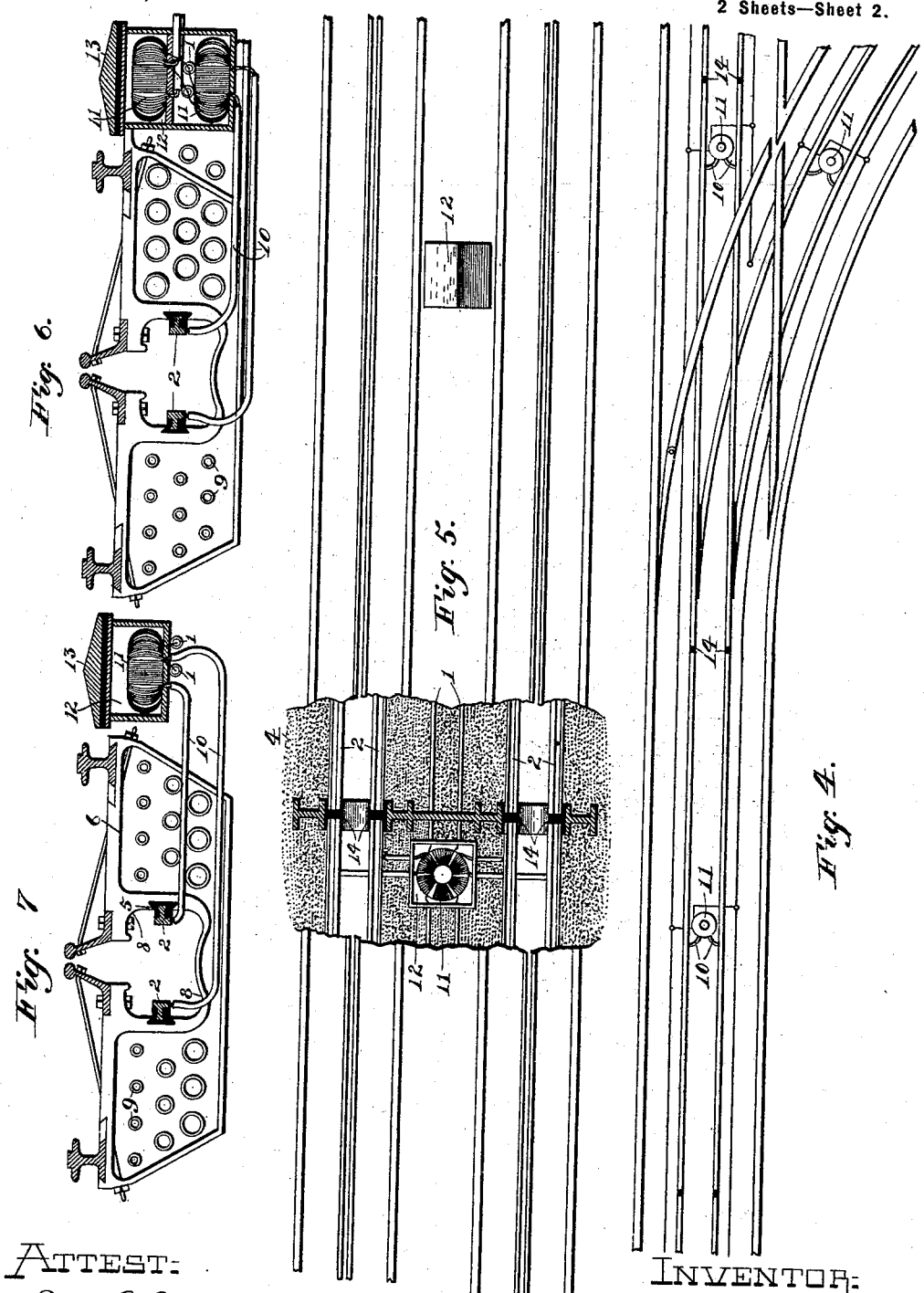

UNITED STATES PATENT OFFICE.

ELIAS E. RIES, OF BALTIMORE, MARYLAND, ASSIGNOR, BY DIRECT AND MESNE ASSIGNMENTS, TO RIES & HENDERSON, OF SAME PLACE.

APPARATUS FOR LINE DISTRIBUTION BY INDUCTIONAL TRANSFORMERS OR SECONDARY GENERATORS FOR ELECTRIC RAILWAYS.

SPECIFICATION forming part of Letters Patent No. 622,865, dated April 11, 1899.

Application filed December 30, 1887. Serial No. 259,413. (No model.)

*To all whom it may concern:*

Be it known that I, ELIAS E. RIES, a citizen of the United States, residing at Baltimore, in the State of Maryland, have invented certain new and useful Improvements in Apparatus for Line Distribution by Inductional Transformers or Secondary Generators for Electric Railways; and I do hereby declare the following to be a full, clear, and exact description of the invention, such as will enable others skilled in the art to which it appertains to make and use the same.

My invention relates to the distribution of electrical energy for electric-railway purposes, and more particularly relates to the conversion and distribution of alternating currents supplied to the line conductors from a generating station or stations by means of inductional transformers or secondary generators.

Heretofore in the ordinary system of electric locomotion the actuating or motive current derived from a stationary source has been conducted by separate conductors arranged parallel and in proximity to the track directly to the motor or motors mounted upon the traveling vehicle. In such systems the currents employed were necessarily of considerable quantity and comparatively low tension and the conductors had to be made of sufficient conductivity to carry such currents without heating. Thus the line conductors were made ordinarily of copper, and when a material of lower conductivity was employed the cross-section of the conductors had to be greatly increased. In addition thereto the generation and transmission over a long line of currents of low tension is impracticable for commercial purposes for purely technical reasons, as is well known to those skilled in the art.

It is the object of my invention to overcome the difficulties of electric locomotion due to the direct communication of the source of electrical energy with the traveling motor by substituting for the system involving such direct communication one, in which the alternating inducing or primary current supplied by the main conductor is converted at intervals along the line by inductional transformers or secondary generators having their primary coils connected in parallel with the said main or primary circuit and their secondary coils with the exposed working conductors, which latter are preferably laid in insulated sections along the line of way and are arranged conveniently for contact with metallic current-collecting devices in circuit with the propelling-motor. Thus I am enabled to employ main and working conductors of small cross-section, to utilize the cheaper alternating currents of high tension and comparatively small quantity, to employ line conductors of inferior conducting capacity in surface, overhead, and underground electric-railway systems, and at predetermined points or distances along the line where the said electrical energy is to be consumed to convert and distribute the initial energy residing in such primary high-tension alternating current into safe working currents of lower tension.

Other advantages enumerated hereinafter result from the employment of my novel system, which embraces a new mode of operation and organization of apparatus, as will clearly appear from the detail description hereinafter.

In my system I arrange one or more generators along the line of way and carry the alternating currents of high tension generated by the same through a thoroughly-insulated conductor into proximity to the working conductors, which are, as before stated, laid in successive insulated sections of required lengths along the track for contact with the current-collecting brushes connected electrically with the propelling-motor mounted upon the traveling vehicle. The primary conductors which carry the generated alternating current will be hereinafter designated as the "main" conductors and the insulated sections carrying the converted alternating or other currents will be called the "working" conductors. Thus there are two independent circuits, one for carrying the primary current generated at the stationary generators and the other for the currents converted by the inductional transformers, which have their primary coils connected in parallel with the main conductors and their secondaries in circuit with the working sections. The two circuits have the relation of external primary and secondary circuits of an inductorium, with this difference, however, that while in the ordinary inductorium the relation of the resistances of the two circuits is such that the induced currents have greater tension than the inducing current in the circuits employed in my system the relation is reversed. The currents to be converted by the transformers are necessarily of alternating character and the converted currents may be utilized in a motor so constructed as to be operated by alternating currents, or these alternating currents after conversion may be first commutated to flow in the same direction and then utilized in an ordinary continuous-current electric motor. This latter mode of operation is, however, not herein illustrated, since, specifically speaking, it forms no part of my present invention, but is covered by my generic claims, being those which do not specify the character of the motor. All this will more fully appear from the following detailed description with reference to the accompanying drawings, which form a part hereof and in which I have illustrated several of the very numerous forms which my invention may assume; but it will be understood that I do not propose to limit myself to the particular embodiment of the principles herein described nor to the details of construction pointed out, since these are only a few specimens of a number which may be employed without departing from the spirit of my said invention.

Figure 1 is a view in diagram of a single-track railway, showing the generating-station, the main conductors forming a round metallic circuit, and working conductors of larger cross-section arranged in insulated sections parallel to said main conductors, and the transformers in circuit with both the main and working circuits in the manner before mentioned. In this instance each transformer is placed centrally in its respective working section for the obvious purpose of equalizing the distribution upon each section. Fig. 2 is a similar view showing the inductional transformers connected in parallel with the main conductors and in circuit with each working section at the end thereof instead of the center. Fig. 3 is a similar view of a double-track railway, showing different modes of arranging the transformers, as described hereinafter. Fig. 4 is a similar view to Fig. 1, showing two main conductors and two working conductors applied to a single-track railway with a branch track proceeding therefrom. Fig. 5 is a top plan view of a double-track railway in which the main and working conductors are carried in an underground conduit. This view has parts broken away to show more clearly the interior construction of the conduit and the arrangement and equipment of my improved system. Fig. 6 is a transverse section on line x x of a part of Fig. 5, a portion of the concrete being removed to show in side elevation the metallic supporting-brackets or diaphragm which is placed at intervals along the way, the construction of the transformers, the means for connecting them with the main and working conductors, and other details of construction explained hereinafter. Fig. 7 is a similar view of a single-track railway and its conduit-bracket in which only one transformer is employed.

Like numerals of reference indicate like or corresponding parts in the several views of the drawings.

My invention is equally applicable to overhead, surface, or underground electric-railway systems. However, for the sake of clearness and convenience I have shown the same applied to a form of conduit which is described, illustrated, and claimed in my separate pending application, filed April 29, 1887, Serial No. 236,546.

Referring to Fig. 5, the main conductors in circuit with the generating station or stations are carried in the insulated ducts or tubes 1 1, which extend along the line of way between the railway-tracks, as shown. The working conductors 2 are supported on the side of the conduit-channels in a convenient position for contact for current-collecting wheels 3 (see Figs. 1, 2, and 3) by the concrete filling 4 and the insulation 5, suitably secured in the undercut recesses in the interior walls 8 of the metallic supporting-brackets 6, which in turn are placed at intervals along the track in the concrete filling, as shown in Fig. 5, and are provided with the circular apertures 9 9 for the reception of tubes or ducts which carry telephone, telegraph, or power wires.

The working conductors 2 2 are, as before stated, placed in insulated sections of any desired length, as shown in Figs. 1, 2, 3, and 4, and are connected by means of the transverse conductors 10 10 (see Figs. 6 and 7) with the terminals of the secondary coils of their respective transformers 11, which in turn have their primaries connected in parallel with the main conductors 1 1, as shown.

It will be obvious that the insulation 14 between the respective sections of the working conductors may be secured in any approved manner. However, in practice it is best to arrange each section of a working conductor so that its extremities will rest upon and be supported by the insulators 5 5 of the brackets, so as to provide a secure lodgment and support for the terminals of each section, and, furthermore, allowing the transformer 11 to be placed centrally in each working section, as shown in Fig. 1.

The transformers 11 consist each of an iron core having its primary and secondary coils wound thereupon, the secondaries being of coarse wire, as shown, and the primaries of fine wire and the primary and secondary coils connected, respectively, with the main and working conductors in the manner before described. My invention is not limited to any specific type or construction of the transformer, such as the stationary transformer herein shown. These transformers are arranged at intervals along the line and in proximity to the working conductors in a suitable boxing 12, having a removable air and water tight lid 13, insulated from the main body of said boxing and provided with a gable-shaped or sloping cover for deflecting any water, dust, or other foreign matter. There is one transformer for each working section, as shown clearly in the diagrammatical views.

In Fig. 1 the transformers are located, as before described, centrally in each working section, being connected in parallel with the main conductors and in circuit with the sectional working conductors by the branch 10.

The object of placing the converter or inductorium in each section is for the purpose of maintaining an equal distribution of the current converted and supplied to the working conductors, so that the motors on one section cannot perceptibly affect any of the motors on the remaining sections.

As a motor proceeds in the direction of the arrow from the generating-station and enters upon the first section of working conductors the mere contact of the collecting-wheels with the working conductors 2 2 will automatically close the secondary or working circuit through the motor, thereby rendering the motor self-regulating in operation and converting only the required amount of current for propelling the motor across that particular section.

In Fig. 2 no insulation is shown between the respective sections, the air-space being relied upon to effect a similar result, and, moreover, the inductional transformers are located at the beginning of each section. However, in this latter respect I would in practice prefer the form shown in Fig. 1.

In the first section of Fig. 3 two transformers are used, one for each track, and the primaries are connected in parallel with each other and with the main conductors and their independent secondaries in circuit with the respective working conductors of the two separate lines.

In the second section shown in Fig. 3 only one transformer is employed, the primary coil of which serves to induce alternating currents in the two independent secondary coils, which latter are in circuit with the working conductors of the respective railway-lines.

In Fig. 6 are shown two transformers, one for each track and both supported in the same boxing and having the terminals of the primary of each connected in common with a main conductor—that is to say, the main conductors, enveloped by the tubes 1 1, furnish the inducing-current for the secondaries of both transformers. The tubes 1 1, containing the main conductors, communicate with the interior of the casing 12 through suitable air and water tight apertures, (not shown,) the main conductor being continued through said casing out through a similar aperture on the other side into the tube 1 and is likewise carried along the line of way.

The details of construction of the casings for the transformers, the special arrangement for insulating the working conductors, the form of the conduits and brackets, and other non-essential points will not be further dwelt upon herein, inasmuch as they form no part of this invention.

By utilizing the high-tension alternating currents of small quantity an appreciable saving in cost of main conductors is attained. Owing to the thorough and economical manner in which they can be insulated no leakage can occur. Working conductors of small cross-section may be used, since only short lengths of the same are included in each working circuit, and the low potential in the working circuit renders the handling of the conductors safe and provides against undesirable leakage.

The distribution to each motor is automatic, inasmuch as no generation of current in the working circuit is effected until the contact-brushes of a motor enter upon that section, and, furthermore, the departure of the motor from any one section immediately and automatically causes the cessation of generation of current in the working circuit.

By reason of the central location of the transformers shown in Fig. 1 the cross-section of the working conductors is reduced one-fourth. Furthermore, such arrangement effects an equal distribution on each side of the transformer, as has been stated before.

The method or art practiced by means of the system herein shown and described I do not claim in this application, since the same forms the subject-matter of another application, Serial No. 243,578, filed July 6, 1887, of which this is a division; but I do claim and desire to secure by Letters Patent—

1. A system of electric propulsion comprising a series of fixed working circuits extending along a railway, traveling motors fed from the working circuits, and inductional transformers charging the working circuits, and charged from a main line, substantially as described.

2. A system of electric propulsion consisting essentially of a main line extending along a railway and charged with intermittent or alternating currents; a series of fixed and normally open working circuits, having exposed contact-surfaces also arranged along the railway; an inductional transformer for each working circuit charged from the main line and discharging into the working circuit, and electric locomotives closing said working circuits and fed by the same, substantially as described.

3. In a system of electric propulsion the combination of a main line extending along a railway and charged with intermittent or alternating currents; with a series of normally open working circuits, having exposed contact-surfaces also arranged along the railway; inductional transformers, the primaries of which are in multiple-arc branches of the main line, and the secondaries of which are connected each with the two branches of a working circuit, and electric locomotives closing said working circuits and fed by the same, substantially as described.

4. In an electric railway, the combination with an electric motor carried by a traveling motor-vehicle; of traveling contacts in circuit with said motor and arranged to make electrical contact with supply-conductors of a working circuit or circuits; one or more fixed and normally open working circuits charged with induced secondary currents; and a charged inducing primary circuit for said working circuit or circuits.

5. In an electric railway, the combination with an electric motor carried by a traveling vehicle; of traveling contacts in circuit with said motor and arranged to make electrical contact with supply-conductors of one or more working circuits; one or more fixed working circuits charged with induced secondary alternating currents of lower tension and greater quantity than the inducing-currents; and a closed main circuit charged with inducing-currents for said working circuit or circuits.

6. In an electric railway, the combination with a closed main circuit charged with inducing electric currents and arranged in inductional proximity to one or more open secondary or working circuits; of one or more fixed and normally open secondary or working circuits; and a motor carried by a traveling vehicle for closing said working circuit or circuits by its passage thereacross; whereby the induced secondary currents are established in the closed working circuit or circuits by the action of the motor in its passage over any of said working circuits.

7. In an electric railway, the combination with a closed main circuit extending along the line of travel; of a series of fixed and normally open working circuits; an inductorium for each of said working circuits having its primary connected in the main circuit and its secondary electrically connected with a working circuit; and means for periodically closing any or all of said working circuits.

8. In an electric railway, the combination with a closed main circuit carrying alternating currents of high tension and small quantity; of an open insulated sectional working circuit arranged parallel and in proximity to said main circuit; an inductional transformer or inductorium having its primary coils connected in parallel with the main circuit and its secondaries connected with said working circuit; and means for closing said open working circuit through the circuit of a traveling motor; whereby the alternating currents of high tension and small quantity carried through the main circuit are converted into similar currents or increased quantity and lower tension when the said working circuit is closed through the circuit of the said motor.

9. In an electric railway, the combination with a closed main circuit; of a series of open sectional working circuits arranged parallel and in proximity to said main circuit along the line of way; an inductional transformer or inductorium having its primary coils connected in parallel with the said main circuit, and its secondary coils electrically connected with the said working circuits; and suitable contact devices in circuit with a propelling electric motor and arranged to close any of said working circuits by the contact of said devices with said circuits.

10. In an electric railway, the combination with a closed main circuit arranged parallel to the line of way; of an open insulated sectional working circuit in proximity to, and parallel with, the main circuit; an inductional transformer or inductorium having its primary coils connected in parallel with said main circuit; and its secondary coils electrically in circuit with the center of said working circuit; and means for closing the said working circuit through the circuit of a propelling electric motor mounted upon a traveling vehicle.

11. In an electric railway, the combination with a closed main circuit arranged parallel to the line of way and carrying alternating currents of high tension and small quantity; an open insulated sectional working circuit; an inductional transformer or inductorium having its primary coils connected in parallel with said main circuit and its secondary coils electrically connected with the said working circuit; and means for automatically closing said open working circuit by the passage of a traveling propelling electric motor thereacross.

12. In an electric railway, the combination with a generator of alternating currents, a vehicle having a propelling-electromotor mounted thereon through which an alternating current is transmitted, and a current-transformer having a primary and secondary coil, said primary coil in operative relation with said generator, and said secondary coil in operative relation with said electromotor, substantially as described.

13. In an electric railway, an alternating generator, feeder-conductors extending therefrom, a number of transformers distributed along the way and connected to the feeder-conductors in parallel arc, working conductors extending along the way and electrically connected with the secondary coils of the transformers, a vehicle or vehicles on said line of railway, and electric motor or motors on said vehicle or vehicles which receive energy from the working conductors in such a way as to be energized by the current from said working conductors, substantially as described.

14. The combination with a source of alternating electric currents, of a wheeled vehicle, a track for the same, an electric motor for driving the vehicle carried thereby, conductors extending along the line of the track from which currents of low tension are delivered to the motor, high-tension conductors also extending along the line of the track and receiving currents from the source, and electric converters having their primary coils connected in parallel with the high-tension conductors and their secondary coils connected with the first-named conductors, substantially as described.

15. A system of electric propulsion comprising a main line charged with high-tension alternating currents, means for converting such alternating high-tension currents into currents of lower tension, working circuits extending along a railway fed by such low-tension currents and a traveling motor fed from the working circuits, substantially as described.

16. A system of electric transmission and distribution for railway and other vehicles, the same comprising a source of alternating or intermittent currents of high tension, a main line or lines of conductors extending from said source along the line of travel, working-circuit conductors also arranged along said line of travel and adapted to carry, and feed to the traveling vehicles, propelling-current of lower tension than that carried by the main-line conductors, and one or more tension-reducing or current-transforming devices interposed between the main-line conductors and the said working conductors, substantially as described.

In testimony whereof I affix my signature in presence of two witnesses.

ELIAS E. RIES.

Witnesses:
GEO. H. TICHENOR,
E. L. WHITE.